United States Patent [19]
Lee

[11] Patent Number: 5,389,982
[45] Date of Patent: Feb. 14, 1995

[54] "OPTICAL SYSTEM FOR LIQUID CRYSTAL PROJECTOR"

[75] Inventor: Seung G. Lee, Kyungki, Rep. of Korea

[73] Assignee: Goldstar Co., Ltd., Seoul, Rep. of Korea

[21] Appl. No.: 84,448

[22] Filed: Jul. 1, 1993

Related U.S. Application Data

[63] Continuation of Ser. No. 812,936, Dec. 24, 1991, abandoned.

Foreign Application Priority Data

Dec. 26, 1990 [KR] Rep. of Korea ............... 20988/1990

[51] Int. Cl.$^6$ ........................................... G03B 21/28
[52] U.S. Cl. ..................... 353/37; 353/20; 353/34
[58] Field of Search ................ 353/30, 31, 33, 34, 353/37, 69, 70, 20; 359/40, 63, 70, 48

[56] References Cited

U.S. PATENT DOCUMENTS

| | | | |
|---|---|---|---|
| 4,127,322 | 11/1978 | Jacobson et al. | 353/37 |
| 4,345,258 | 8/1982 | Tsai et al. | 353/31 |
| 4,500,172 | 2/1985 | Gagnon et al. | 353/31 |
| 4,715,684 | 12/1987 | Gagnon | 353/33 |
| 4,913,529 | 4/1990 | Goldenberg | 353/81 |
| 4,935,758 | 6/1990 | Miyatake et al. | 353/34 |
| 4,969,730 | 11/1990 | van der Brandt | 353/34 |
| 5,028,121 | 7/1991 | Baur et al. | 353/81 |
| 5,042,921 | 8/1991 | Sato et al. | 359/40 |
| 5,153,752 | 10/1992 | Kurematsu et al. | 359/40 |
| 5,172,254 | 12/1992 | Atarashi et al. | 359/40 |
| 5,200,843 | 4/1993 | Karasawa et al. | 359/40 |
| 5,235,444 | 8/1993 | de Vaan | 359/40 |

FOREIGN PATENT DOCUMENTS 0211418  8/1990  Japan ................... 353/20

Primary Examiner—William A. Cuchlinski, Jr.
Assistant Examiner—William C. Dowling

[57] ABSTRACT

An optical system of a liquid crystal projector includes a metal halide lamp as a light source of a high luminance, a polarized light prism for separating the light from the metal halide lamp into respective light elements of the visible rays in accordance with spectral characteristics of the light, a heat absorption filter for filtering off other rays except for the visible rays from the light in order to remove heat which is generated from the other rays, reflection liquid crystal panels which are each arranged at the front side or at a side of the polarized light prism and having a red, green or blue light reflection mirror mounted on the rear surface thereof, and a projection lens for composing the incident light elements from the liquid crystal panels into a composed color image and then projecting the composed color image on a screen. The light source emits a light having spectral characteristics in that the radiation of the red light element thereof is less intense than those of the green and the blue light elements, for thereby improving the color tone of the image. The polarized light prism and the reflection liquid crystal panels causes the optical path of the optical system to be shorter, for thereby improving the resolution of the color of the image and for also simplifying the construction of the optical system.

5 Claims, 3 Drawing Sheets

"OPTICAL SYSTEM FOR LIQUID CRYSTAL PROJECTOR"

This application is a continuation, of application Ser. No. 07/812,936, filed on Dec. 24, 1991, now abandoned.

BACKGROUND OF THE INVENTION

1. Field of the Invention

The present invention generally relates to liquid crystal projectors, and more particularly to an optical system of such a liquid crystal projector which has a simple construction including a polarized light separation prism and a plurality of liquid crystal panels which are each provided with a light reflection mirror mounted on a surface thereof and the liquid crystal projector is capable of providing an image of high resolution power.

2. Description of the Related Art

In conventional liquid crystal projectors, light emitted from the light source is separated into three light elements, that is, a red light element, a green light element and a blue light element, and the light is then composed into a desired color image. Thereafter, the composed color image is projected as an enlarged image onto a screen of a projection lens.

Known liquid crystal projectors are generally provided with a halogen lamp as a light source. The halogen lamp has the characteristics of emitting a light which consists of the red light element, the green light element and the blue light element in the spectral characteristics. As a result, the light having been emitted from the halogen lamp of the known liquid crystal projector is separated into the red, green and blue light elements by a plurality of optical separating members, such as red, green and blue light reflection mirrors. Thereafter, the separated light elements are transmitted through three liquid crystal panels, respectively, in order to obtain three images each reemerging in each color, and the liquid crystal panel is capable of controlling the transmissivity of each light element. The three images are next composed into a desired color image by a light separation/composition prism, and then projected on the screen as the enlarged Image by means of the projection lens.

Here, the light separation/composition prism is capable of composing the respective light elements which are received by the prism in three directions and have respective characteristic wave lengths. The light separation/composition prism is capable of separating a light into respective light elements in the case of receiving the light in a receiving direction.

Hereinafter, the known liquid crystal projector will be described in detail in conjunction with FIG. 1 which is a schematic view showing a representative example of a conventional liquid crystal projector.

As shown in FIG. 1, the liquid crystal projector includes a high luminance halogen lamp 1 as a light source for emitting the light. The light having been emitted from the halogen lamp 1 is first filtered by a 45° inclined blue light reflection mirror 2 which is positioned on an optical path from the lamp 1 in a predetermined distance after the lamp 1 and adapted for separating the blue light element from the light. Here, the blue light element is reflected by the blue light reflection mirror 2 in order to reach a first 45° inclined total reflection mirror 3 which is adapted to reflect the blue light element. The blue light element having been reflected by the first total reflection mirror 3 is then transmitted through a first liquid crystal panel 4. On the other hand, the light having been transmitted through the blue light reflection mirror 2 is, thereafter, filtered by a 45° inclined green light reflection mirror 5, which is positioned on the optical path after the blue light reflection mirror 2, for filtering off the green light element therefrom. An accordance, the green light element is reflected by the green light reflection mirror 5 so as to be transmitted through a second liquid crystal panel 6. As a result, only the red light element is transmitted through the green light reflection mirror 5. The red light element is then reflected by second and third 45° inclined total reflection mirrors 7 and 8 so as to be transmitted through a third liquid crystal panel 9.

During the transmission of the red, green and blue light elements through the three liquid crystal panels 4, 6 and 9, three images reemerge in respective colors. Thereafter, the reemerging three images are applied in each incident direction to the light separation/composition prism, such as a dichroic prism 10 in which the blue and red color images are reflected at a 90° reflection angle, and the green color image is transmitted in a straight direction. Thereby, the three color images-to be composed are formed into a desired color image. The composed color image from the prism 10 is projected on a screen 12 as an enlarged image by a projection lens 11. However, a problem of the above-mentioned conventional liquid crystal projector is that it includes a halogen lamp of a high luminance which emits light having a spectral characteristics in which the red light element of the light has a more intense radiation than those of the other light elements. Therefore, in an effort to solve the problems resulting from the light source, the optical system of the conventional liquid crystal projector is such arranged so that the length of the optical path of the red light element is longer than those of the other light elements as shown in FIG. 1 in order to compensate for the intense radiation of the red light element. However, the compensation for the intense radiation of the light elements has not been sufficient. Thus, the conventional liquid crystal projector has a disadvantage in that the projected image on the screen almost appear to be red. Thereby, a high resolution image is prevented from being obtained. In addition, it is difficult to manufacture the light separation/composition prism such as the dichroic prism used in the conventional liquid crystal projector. Furthermore, the dichroic prism is a costly, heavy and fragile element. The conventional liquid crystal projector additionally has a relatively complex construction from using a plurality of liquid crystal panels.

SUMMARY OF THE INVENTION

In accordance, it is an object of the present invention to provide an optical system for a liquid crystal projector, in which the above disadvantages can be overcome, comprising a polarized light separation prism and a metal halide lamp as a light source. Thereby a simple construction of the liquid crystal projector is accomplished and a color image of a high resolution in reemerging is also provided.

The above-mentioned object of this invention can be accomplished by providing an optical system for a liquid crystal projector comprising: a metal halide lamp as a light source of a high luminance for emitting light; a polarized light prism for separating the light having been emitted from the metal halide lamp into respective light elements of the visible ray in accordance with the spectral characteristics of the light, the prism being disposed at the front of the metal halide lamp as spaced apart therefrom in a predetermined distance; a heat absorption filter for filtering off other rays except for the visible ray from the light having been emitted from the metal halide lamp in order to remove heat which is generated from the other rays, the filter being disposed between said metal halide lamp and the polarized light prism; reflection liquid crystal panels which are each arranged at a front side or at a side of the polarized light prism and having a red, green or blue light refelection mirror mounted on a rear surface thereof; and a projection lens for projecting the incident light elements, which elements have been applied by the liquid crystal panels thereto through the polarized light prism, into a composed color image and then projecting the composed color image on a screen, the projecting lens being arranged at a side of the polarized light prism.

In accordance with the optical system of this invention, the light source comprising the metal halide lamp for emitting a light having spectral characteristics such that the radiation of the red light element thereof is less intense than the radiation of the green and the blue light elements. As a result, the color tone of the image reemerging on the screen is improved. Furthermore, the polarized light prism and the reflection liquid crystal panels each provided with a red, green or blue light reflection mirror cause the optical path of the optical system to be relatively shorter, for thereby improving the resolution of the color of the reemerging image and for also simplifying the construction of the optical system.

BRIEF DESCRIPTION OF THE DRAWINGS

The above and other objects, features and other advantages of the present invention will be more clearly understood from the following detailed description taken in conjunction with the accompanying drawings, in which:

FIGS. 3 and 4 show the operation of the optical system of FIG. 2, in which:

FIG. 3 is a view showing a change of a polarized direction of a polarized light wave by a reflection liquid crystal panel of the optical system for an embodiment of the present invention; and FIG. 4 is a view showing a separation of a light into light elements of the visible ray by means of a polarized light prism.

DESCRIPTION OF THE PREFERRED EMBODIMENTS

Figure 1:
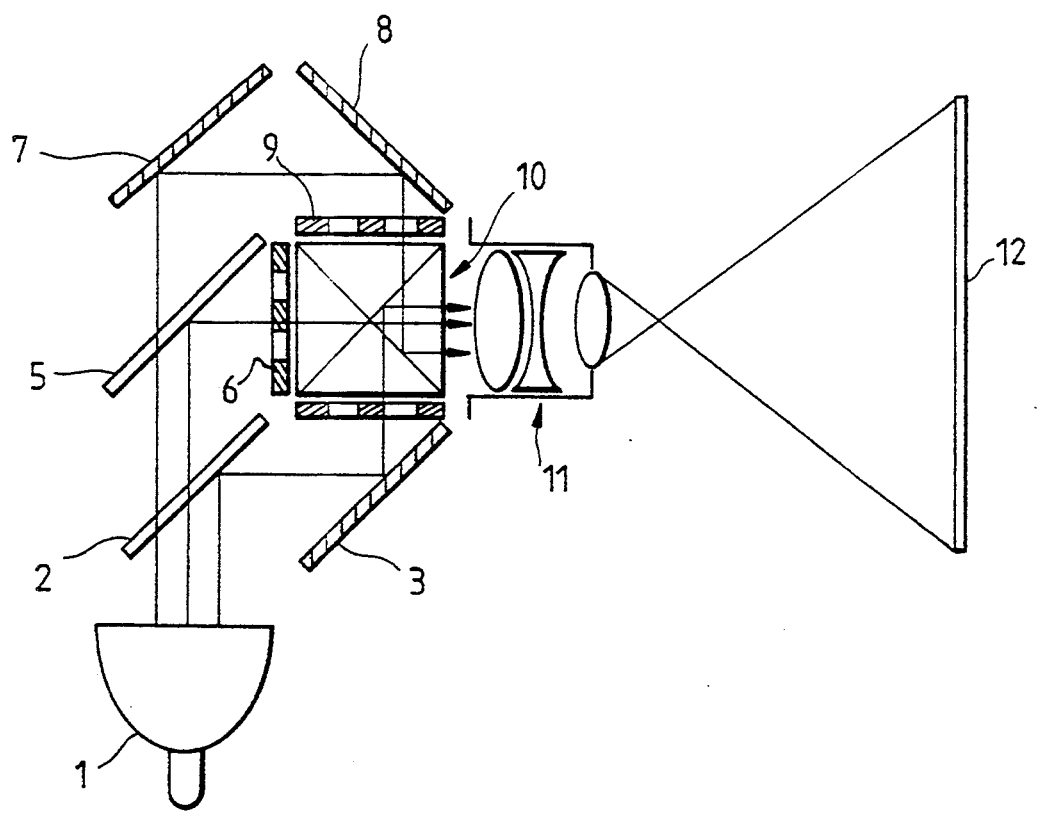
FIG. 1 is a schematic view showing an optical system of a liquid crystal projector according to the prior art.
Figure 2:
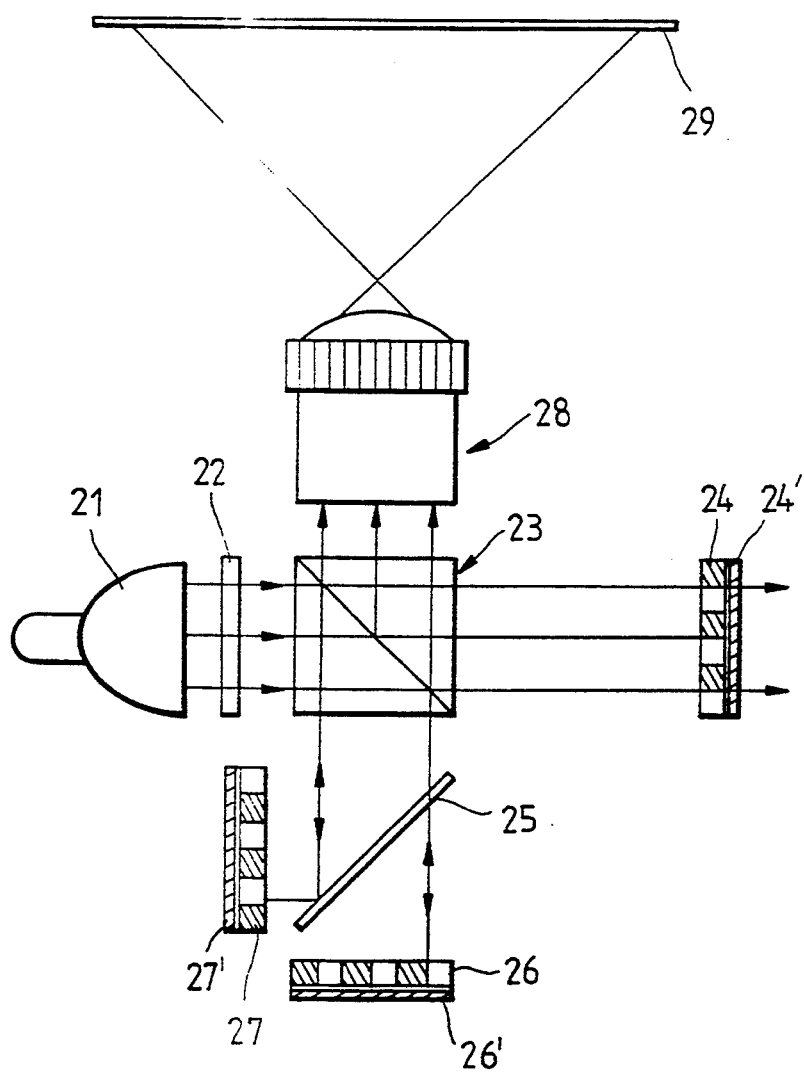
FIG. 2 is a view showing an optical system for an embodiment of the present invention.

Referring first to FIG. 2, a schematic view showing an optical system of a liquid crystal projector according to an embodiment of the present invention, the system includes a metal halide lamp 21 as a light source of a high luminance for emitting a light, a polarized light separation prism 23 for separating the light from the metal halide lamp 21 into polarized light of visible rays and arranged at a side of the metal halide lamp 21 in order to be apart therefrom in a predetermined distance. A heat absorption filter 22 is disposed between the metal halide lamp 21 and the polarized light separation prism 23 in order to filter the light from the metal halide lamp 21 and to filter off other rays, except for the visible ray, where the other rays generally generate a heat.

In addition, the optical system is provided with a first reflection liquid crystal panel 24 arranged on an optical path, in which the optical path is coaxial with the metal halide lamp 21 and the polarized light separation prism 23, is thereby disposed to be spaced at a predetermined distance from the polarized light separation prism 23. The first reflection liquid crystal panel 24 has a blue light reflection mirror 24' which is mounted on the rear surface thereof. A 45° inclined green light reflection mirror 25 is arranged at the rear of the polarized light separation prism 23 so disposed to be spaced apart therefrom in A predetermined distance. Additionally, there is provided second and third reflection liquid crystal panels 26 and 27. The second reflection liquid crystal panel 26 is arranged at the rear of the green light reflection mirror 25 so disposed to be spaced apart therefrom in a predetermined distance and has a red light reflection mirror 26' which is mounted on the rear surface thereof. While, the third reflection liquid crystal panel 27 is arranged at a side of the green light reflection mirror 25 so disposed to be spaced apart therefrom in a predetermined distance and has a green light reflection mirror 27' which is mounted on the rear surface thereof.

The optical system is additionally provided with a projection lens 28 and a screen 29, both being sequentially arranged at the front of the polarized light separation prism 23 disposed to be spaced apart from each other in a predetermined distance.

Figure 3:
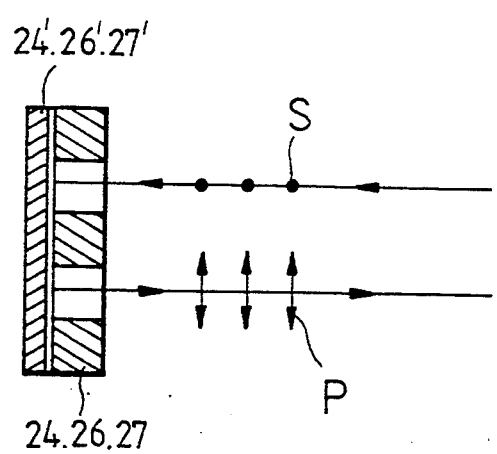
Figure 4:
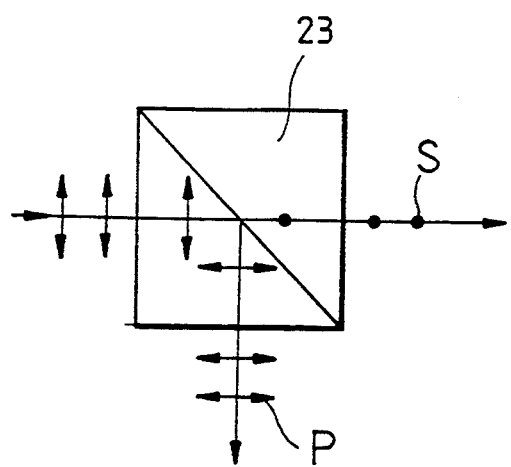

Here, the first, second and third reflection liquid crystal panels 24, 26 and 27 each correspond to one of two types of polarized light waves, that is, an S-type wave or a P-type wave (see FIG. 3), so that the light having been emitted from the metal halide lamp 21 is separated by the polarized light separation prism 23 into the two types of polarized light waves, that is, the S-type wave and the P-type wave of which one is transmitted through and the other is reflected by the polarized light separation prism 23 (see FIG. 4).

As shown in FIG. 3, the first, second and third reflection liquid crystal panels 24, 26 and 27 each rotate a polarized direction of an incident polarized light wave by virtue of a voltage difference between opposite ends of the first, second and third liquid crystal panels 24, 26 and 27. Thereafter, the polarized light wave is reflected by the blue, red and green light reflection mirrors 24', 26' and 27' simultaneously with rotating the polarized direction thereof so that the reflected polarized light wave has a polarized direction which is different from that of the incident polarized light wave. As a result, the incident polarized light wave of the S-type wave may change into the P-type wave as it is reflected by the first, second and third reflection liquid crystal panels 24, 26 and 27 as shown in FIG. 3.

The metal halide lamp 21 is a kind of a discharge lamp which emits a light having spectral characteristics in that the blue and green light elements thereof have a more intense radiation than that of the red light element so that it improves the resolution of the color in reemerging the desired color image in cooperating with the above-mentioned characteristics of the first, second and third reflection liquid crystal panels 24, 26 and 27 and the blue, red and green light reflection mirrors 24', 26' and 27'.

Of course, it should be understood that the optical system of this embodiment uses the metal halide lamp 21 only for improving the resolution of the color In reemerging the color image as much as possible. As a result, the light source of this optical system may include another type of lamp, besides the metal halide lamp, which can improve the resolution of the color in reemerging the color image. In addition, the relative positions of the reflection liquid crystal panels 24, 26 and 27 and the reflection characteristics of the blue, red and green light reflection mirrors 24', 26', 27' and 25 should be relatively controlled in accordance with the spectral characteristics of the light of the light source, such as the metal halide lamp 21, in order to accomplish a desired optimum resolution of the color in reemerging the color image.

On the other hand, the 45° inclined green light reflection mirror 25 is arranged so as to be inclined at a 45° angle of inclination in this embodiment of this invention, as described above. However, the angle of inclination of the green light reflection mirror 25 is not limited to the 45° angle, even though the green light reflection mirror 25 which is arranged at the 45° angle of inclination provides an optimum operational effect of the optical system in the case of taking into account the construction and the performance thereof. If the green light reflection mirror 25 is arranged at another angle of inclination besides the 45° angle, the layout for arranging the elements of the optical system will be changed a little from the arrangement represented in FIG. 2.

Even though it is not represented in the drawings, the optical system of this invention may include a 45° inclined red light reflection mirror instead of the above-mentioned 45° inclined green light reflection mirror 25. In this case, the first reflection liquid crystal panel 24 is arranged at the front of the polarized light separation prism 23 and has the blue light reflection mirror 24' on the rear surface thereof. However, the second reflection liquid crystal panel 26 having the red light reflection mirror 26' will be arranged at a side of the red light reflection mirror, that is, at the position of the third liquid crystal panel 27 in FIG. 2. In addition, the third reflection liquid crystal panel 27 having the green light reflection mirror 27' will be arranged at a rear of the red light reflection mirror, that is, at the position of the second liquid crystal panel 26 in FIG. 2.

In addition, the heat absorption filter 22 is adapted to filter the light from the metal halide lamp 21 in order to allow only the visible rays to be transmitted therethrough and to filter off other rays, such as the infrared rays, the ultraviolet rays and the like which generate heat, by absorbing or reflecting them. If the other rays of the light which generate heat are not filtered off, the heat from the rays may damage the coated surfaces of the polarized light separation prism 23 and the blue, red and green light reflection mirrors 24', 26' and 27', and also change the characteristics of the liquid crystal enclosed in each reflection liquid crystal panel 24, 26, 27. Thereby, a deterioration of a given function of the first, second and third reflection liquid crystal panels, 24, 26, 27 results.

The operational effect of the optical system of the embodiment having the above-mentioned construction will be described as follows.

Upon turning on the liquid crystal projector, the metal halide lamp 21 as the light source of a high luminance first emits a light of three light elements, that is, the red light element, the green light element and the blue light element. The light from the metal halide lamp 21 is filtered by the heat absorption filter 22 so as to filter off the rays except for the visible ray, and the list is then received by the polarized light prism 23 so as to be separated into two types of polarized lights, S-type and P-type polarized lights, in accordance with the spectral characteristics of the light of the visible ray as represented in FIG. 4.

In accordance with FIG. 4, the polarized light separation prism 23 allows the P-type wave to be reflected thereby and the S-type wave to be transmitted therethrough. The S-type polarized light wave having been transmitted through the polarized light separation prism 23 is received by the first liquid crystal panel 24 and is then reflected by the blue light reflection mirror 24' so that a polarized light wave having a blue color images in accordance with an image signal is reflected. At this time, the other light elements except for the blue light element are transmitted through the blue light reflection mirror 24'. Additionally, the S-type incident polarized light wave is changed to the P-type polarized light wave due to the voltage difference between the opposite ends of the first liquid crystal panel 24 as described above. The reflected P-type wave having the blue color image is then received by the polarized light separation prism 23 so as to be reflected to the projection lens 28.

On the other hand, the P-type wave having been reflected by the polarized light separation prism 23 is filtered by the 45° inclined green light reflection mirror 25 in order to reflect the green light element to the third liquid crystal panel 27 and the green light reflection mirror 27'. By the third liquid crystal panel 27 and the green light mirror reflection 27', the P-type incident polarized light wave has a green color image and also is reflected by the green light mirror reflection 27' to the polarized light separation prism 23 by way of the 45° inclined green light reflection mirror 25. At this time, the P-type incident polarized light wave is changed to the S-type wave in the same manner as described above. As a result, the reflected S-type wave having the green color image is transmitted through the polarized light separation prism 23 in order to reach the projection lens 28.

:In addition, the P-type wave having been transmitted through the 45° inclined green light reflection mirror 25 is then received by the second liquid crystal panel 26 and the red light reflection mirror 26'. At the second liquid crystal panel 26 and the red light reflection mirror 26', the P-type incident polarized light wave has a red color image and is also reflected by the red light reflection mirror 26' to the prism 23 by way of the 45° inclined green light reflection mirror 25. At this time, the P-type incident polarized light wave is changed to the S-type wave in the same manner as described above. As a result, the reflected S-type wave having the red color image is transmitted through the polarized light separation prism 23 in order to reach the projection lens 28.

At the projection lens 28, the respective color images are composed into a desired color image and then projected as an enlarged reemerging image onto the screen 29.

As described above, the optical system for the liquid crystal projector of this invention is provided with a light source including a metal halide lamp which emits a light having spectral characteristics in that the radiation of the red light element thereof is less intense than those of the green and the blue light elements, for thereby providing an advantage in that it improves a color tone of the image reemerging on the screen. In addition, the optical system includes a polarized light prism and a plurality of reflection liquid crystal panels each provided with a red, green or blue light reflection mirror which causes the optical path of the optical system to be relatively shorter, for thereby providing another advantage in that it Improves the resolution of the color of the reemerging image and also simplifies the construction of the liquid crystal projector.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical system for a liquid crystal projector, comprising:
    a light source of high luminance for emitting a light;
    a polarized light prism for separating the light into polarized light of visible rays of three components having been emitted from said light source by reflection and transmitting the light in accordance with the polarized light of visible rays of three components, said polarized light prism being disposed at a front of said light source and spaced apart from said light source by a predetermined distance;
    first reflecting means for selectively reflecting one component of the polarized light of visible rays of three components from said polarized light prism and allowing the two remaining components to pass therethrough;
    second reflecting means for reflecting one of the two remaining components of the polarized light of visible rays of three components from said polarized light prism toward a first liquid crystal display panel by a first reflection mirror and reflecting the other of the two remaining components toward said polarized light prism by a second liquid crystal display panel;
    composing means for composing the incident light having been reflected by said first and second reflecting means thereto into a composed color image; and
    projecting means for projecting said composed color image on a screen, said projecting means being arranged at a side of said polarized light prism;
    said first reflecting means including,
        a first liquid crystal display for transmitting a polarized light transmitted from said polarized light prism, and
        a reflection mirror for transmitting a component besides a predetermined color component and reflecting a predetermined color component of the polarized light transmitted from said liquid crystal display, said reflection mirror being disposed at a rear surface of said liquid crystal display.

2. An optical system according to claim 1, wherein said first reflection mirror reflects only said one component of the polarized light of visible rays of three components reflected by the polarized light prism at a predetermined angle and said second reflecting means includes,
    a first reflecting panel for transmitting or reflecting said one of the polarized light of visible rays of three components being reflected by said first reflection mirror, and
    a second reflecting panel for transmitting or reflecting one of the two components besides said one component of the polarized light of visible rays of three components from said first reflection mirror.

3. An optical system according to claim 2, wherein said first reflection mirror is mounted between the polarized light prism and the second reflecting panel at a 45° inclination to the light incident thereto.

4. An optical system according to claim 2, wherein said first reflecting panel includes:
    a liquid crystal display for transmitting a light of said one component of the polarized light of visible rays of three components reflected by said first reflection mirror; and
    a reflection mirror for reflecting the light being transmitted through the second liquid crystal display to said first reflection mirror in an opposite direction to light incident to said second liquid crystal display, said reflection mirror being disposed at a rear surface of the second liquid crystal display.

5. An optical system according to claim 2, wherein said second reflecting panel includes:
    a liquid crystal display for transmitting a light having two-color components being transmitted from said first reflection mirror; and
    reflection mirror for reflecting a predetermined color component of light which is transmitted through said second liquid crystal display, selectively, to said first reflection mirror, said reflection mirror being disposed at a rear surface of said liquid crystal display.

* * * * *